April 11, 1950 — J. F. PETERS, JR — 2,504,086

FASTENER CLIP FOR FLANGED SUPPORTS

Filed July 14, 1944

Inventor
James F. Peters, Jr.
By Walter S. Jones
Attorney

Patented Apr. 11, 1950

2,504,086

UNITED STATES PATENT OFFICE 2,504,086

FASTENER CLIP FOR FLANGED SUPPORTS

James F. Peters, Jr., Dorchester, Mass., assignor to United-Carr Fastener Corporation, Cambridge, Mass., a corporation of Massachusetts Application July 14, 1944, Serial No. 544,989

3 Claims. (Cl. 24—81)

The present invention relates to fastener clips and more particularly to fastener clips designed to be slipped upon a support and grip opposite faces thereof and provided with means to receive and retain a part to be supported by said clip on the support.

More particularly the invention provides a new and improved clip for removably attaching cable harness clamps and the like to a structural member or support.

One of the primary objects of the invention is the provision of an improved and simplified construction of fastener clip of the above described type, capable of being readily slipped upon a support, such as a channel or angle structural member, and which will be securely gripped thereon to prevent displacement thereof even when subjected to excessive vibration.

The above and other aims and advantages of the invention will be apparent from a consideration of the accompanying drawings and annexed specification illustrating and describing preferred forms of the invention.

Figure 1:
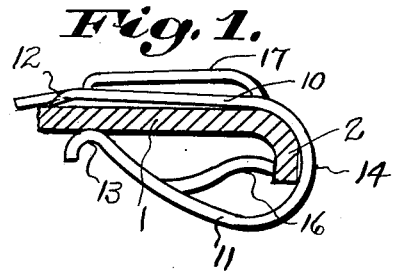
Fig. 1 is a side elevation of one form of improved clip embodying the invention as applied to a support which is shown in section.
Figure 2:
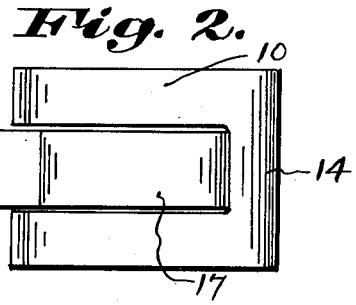
Fig. 2 is a top plan view of the clip.
Figure 3:
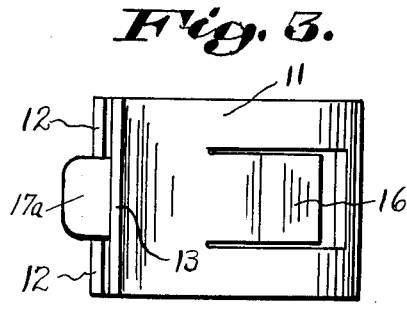
Fig. 3 is a bottom plan view thereof.

Referring further to the drawings, and particularly to Figs. 1 to 3 thereof, the improved fastener clip is advantageously formed of a single piece of resilient strip material, such as spring sheet metal, and comprises a substantially U-shaped member providing a relatively flat article-supporting base portion 10 adapted to engage and bear against an outer face of the support 1, and a relatively ogee or S-shaped clamping portion 11 adapted to engage an opposite face or faces of the support at spaced points. The free terminal end 12 of the base portion 10 advantageously extends beyond the terminal end 13 of the clamping portion 11, the latter being rounded and flanged so as to provide an intermediate flaring entering throat to permit the fastener clip to be readily slipped over the support.

Figure 4:
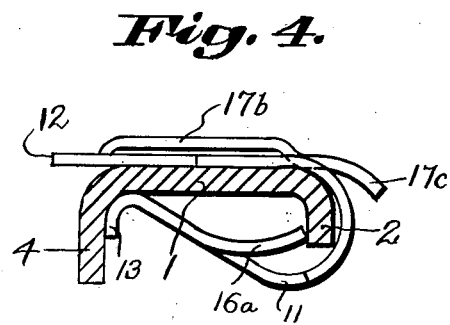
Fig. 4 is a side elevation similar to Fig. 1, illustrating a modified form of clip embodying the invention and an alternative form of support.

The support 1 may be of any desired shape such as a plain plate or web, or a part of an angle, channel or Z-section commonly employed in aircraft construction having a reinforcing marginal flange 2. In some instances, the support 1 may have an opposed flange 4 as indicated in Fig. 4, in which case the support may be considered a channel section.

The clamping portion 11, as above stated, is of ogee or S-shape, being connected to the base by a bight 14 encompassing one edge or flange 2 of the support, and inclined upwardly toward the base 10, terminating in the rounded downwardly turned terminal end 13. This end 13 bears against the under face of the support 1 and may also engage the flange 4 when applied to a channel section, to limit movement transversely on the support in one direction. This limiting of movement of the clip may also be effected by the bight 14.

The clamping portion 11 is provided with a resilient stop member adapted to engage the support 1, for example the flange 2 thereof, and prevent movement of the clip from the support. In the form of the invention shown in Figs. 1 to 3, this stop member may be in the form of a tongue 16 cut from the body of the clamping portion 11, which tongue extends rearwardly and upwardly to seat against the flange 2. Due to its resilience the tongue will yield downwardly past the flange as the clip is slipped on the support and will then snap into locking position against the flange 2.

The article-supporting base portion 10 provides a supporting surface for the part to be supported by the clip, which conveniently may be a cable harness clamp of approved design, such for example as illustrated in the United States patent to Churchill No. 2,327,326 of August 17, 1943. Such clamps usually have a sheet metal part for engagement by the fastener clip.

To retain such a part on the supporting base, the latter is provided with an article-engaging and retaining means which preferably may be in the form of a tongue 17 struck outwardly from the body of the base and joined thereto adjacent the bight 14. The free end portion 17a of the tongue 17 may be positioned below the upper surface of the base 10 and the tongue may be shouldered, as shown, to retain the part to be supported between the tongue 17 and base 10.

Preferably the base portion is provided with resilient teeth to bite into the support and prevent accidental slippage of the clamp thereon. In the embodiment of the invention shown in Figs. 1 to 3, these teeth may be formed as knife edges on the free terminal end edges 12 of the base 10, the ends being slightly inturned for biting engagement with the support.

Figure 5:
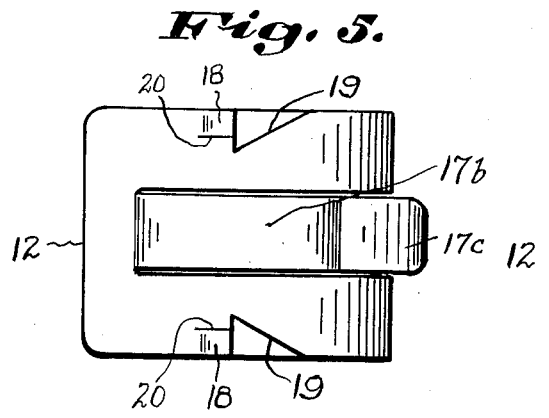
Fig. 5 is a top plan view of the clip shown in Fig. 4.
Figure 6:
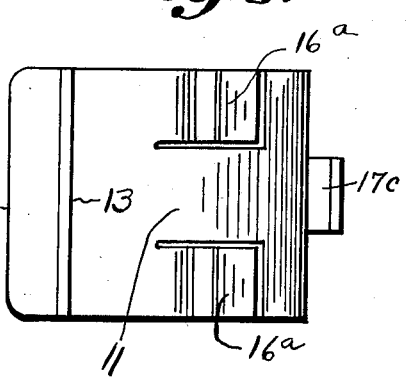
Fig. 6 is a bottom plan view thereof.

The fastener clip illustrated in Figs. 4 to 6 is very similar to the clip above described. In this form of the invention the tongue 17$^b$ is joined to the base 10 adjacent the terminal end 12 thereof and its free end 17$^c$ extends over and beyond the bight portion. The teeth 18 may be formed along the marginal sides of the base 10 by first notching the base as at 19 and then slitting the base 10 along lines 20 to provide the teeth 18 which may be downturned for biting engagement with the support. In this embodiment of the invention the stop member on the clamping portion 11 may be formed with side tongues 16$^a$ formed by slitting opposite sides of the clamping portion 11.

It will be apparent that the improved fastener clip of the invention is simple of construction and may be readily slipped upon an angle, channel or other support, and that when positioned on the support will be securely retained thereon against accidental movement in all directions.

Although I have illustrated and described one specific embodiment of the invention, I do not wish to be limited thereby because the scope of the invention is best defined by the appended claims.

I claim:

1. A fastener clip for attachment to a support having an angularly disposed flange along at least one of its edges, said clip being of general U-shaped form providing an article-supporting base portion adapted to engage one face of the support and a converging clamping portion adapted to engage adjacent its terminal end an opposite face of the support, means extending from the clamping portion in a direction away from its terminal end and adapted to engage a face of the support flange, a plurality of resilient inwardly turned support-gripping means on said article-supporting base portion for engaging a flat surface of the support, and article-retaining means on said base portion for engaging an article to be supported thereby.

2. A fastener clip for attachment to a support having an angularly disposed flange along at least one of its edges, said clip being of general U-shaped form providing an article-supporting base portion adapted to engage one face of the support and a converging clamping portion adapted to engage adjacent its terminal end an opposite face of the support, means extending from the clamping portion in a direction away from its terminal end and adapted to engage a face of the support flange, the terminal end of said base portion being divided and inturned providing resilient support-gripping means for engaging a flat surface of the support, and article-retaining means on said base portion for engaging an article to be supported thereby.

3. A fastener clip for attachment to a support having an angularly disposed flange along at least one of its edges, said clip being of general U-shaped form providing an article-supporting base portion adapted to engage one face of the support and a converging clamping portion adapted to engage adjacent its terminal end an opposite face of the support, means extending from the clamping portion in a direction away from its terminal end and adapted to engage a face of the support flange, the marginal side edges of said base being provided with resilient teeth for gripping engagement with a flat surface of the support, and article-retaining means on said base portion for engaging an article to be supported thereby.

JAMES F. PETERS, Jr.

REFERENCES CITED

The following references are of record in the file of this patent:

UNITED STATES PATENTS

| Number | Name | Date |
| --- | --- | --- |
| 295,526 | Deniston | Mar. 25, 1884 |
| 1,023,219 | Munger | Apr. 16, 1912 |
| 1,744,196 | Ames | Jan. 21, 1930 |
| 2,322,657 | Olsen | June 22, 1943 |
| 2,323,689 | Tinnerman | July 6, 1943 |